(No Model.)
C. W. GLOVER.
LATHE CHUCK.
No. 312,838. Patented Feb. 24, 1885.
Fig. 1.
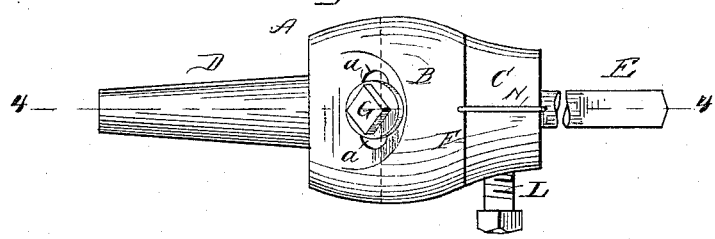
Fig. 2.   Fig. 3.
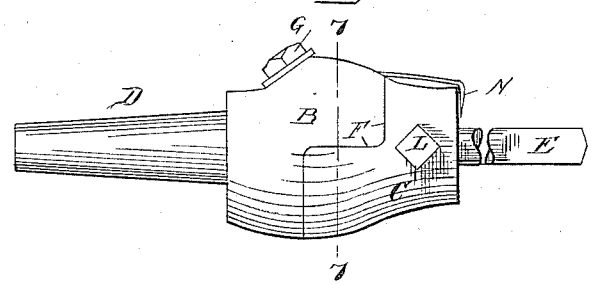 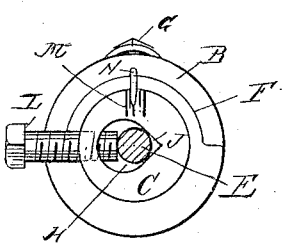
Fig. 4.   Fig. 5.
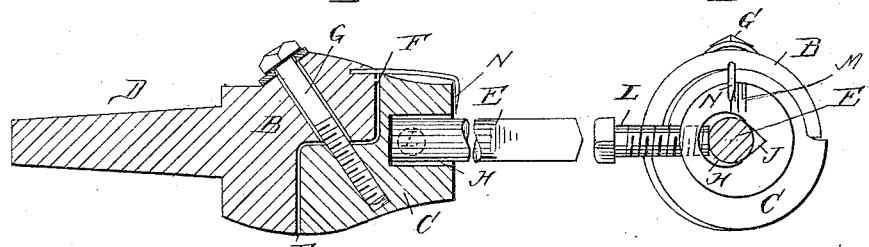 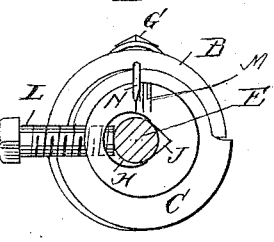
Fig. 6.   Fig. 7.   Fig. 8.
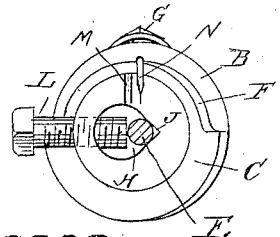 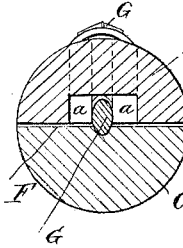 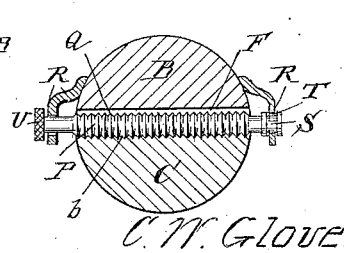
Witnesses.
Wm. S. Bellem
Geo. W. McGwen.
C. W. Glover,
Inventor,
per Brown Bros.
Attys

UNITED STATES PATENT OFFICE.

CARLOS W. GLOVER, OF BOSTON, MASSACHUSETTS.

LATHE-CHUCK.

SPECIFICATION forming part of Letters Patent No. 312,838, dated February 24, 1885.

Application filed November 30, 1883. (No model.)

*To all whom it may concern:*

Be it known that I, CARLOS W. GLOVER, of Boston, in the county of Suffolk and State of Massachusetts, have invented certain new and useful Improvements in Lathe-Chucks, of which the following is a full, clear, and exact description.

This invention consists in the construction and arrangement of a chuck for a drill, &c., for use more particularly in a lathe, all substantially as hereinafter fully described, reference being had to the accompanying plate of drawings, in which—

Figures 1 and 2 are side views, at right angles to each other, of a chuck constructed according to this invention having a drill inserted therein. Fig. 3 is a front view of Fig. 2. Fig. 4 is a longitudinal section on line 4 4, Fig. 1; and Figs. 5 and 6, similar front views to Fig. 3, but with drills of different sizes. Fig. 7 is a cross-section on line 7 7, Fig. 2; and Fig. 8 is a detail view in cross-section, to be hereinafter referred to.

In the drawings, A represents a chuck consisting of two parts, B and C, the part B adapted by its shank D to fit the mandrel of a lathe, &c., for the operation of the drill E, which is received and held by the part C. These two parts B and C are constructed and adapted to be joined together by a joint, F, (shown more particularly in Figs. 2 and 4,) extending across the chuck at a right angle to its axial line, by which joint F the part C can slide or move back and forth across the part B.

G is a screw passing loosely through a transverse slot, *a*, in the part B, and screwing into the part C, and in a line preferably at an angle intermediate of the lines forming the joint F, as shown in Fig. 4, so that screwing up the screw G the part C will be secured and held firm and rigidly to the part B. The slot *a* allows for the movement of the screw laterally in the part B when the part C is moved across the same.

H is a central longitudinal socket in the part C for the drill E, and it is of a diameter sufficient to receive a drill of the largest size for which the chuck is adapted. One side of said socket H is cut away, as at J, and it is of V shape in cross-section, the walls of which are longitudinally parallel, and laterally are of equal angles with the central axial line of the chuck. A drill placed in the socket H bears against the two walls of the angular portion J, and is there held by a set-screw, L, screwing into one side of the part C. The drill, when thus secured, will be true, and its center coincident with the plane of the central axial line of the chuck and the true apex of the angular walls J. This line or plane between the walls J and their apex and the central axial line of the chuck is and should be exactly at right angles to the line of movement of the two parts B and C across each other, so that on moving the part C across the part B in the proper direction until the drill on this line comes to the center of the mandrel, and then securing the parts together by the screw G, the drill will then be in the center of the chuck and lathe, and ready for work. Different sizes or diameters of drills can be used, and yet all be brought to the center of the chuck, as is obvious, and as shown in the drawings, more particularly in Figs. 3, 5, and 6, these views showing drills of three different diameters, the one in Fig. 6 being the smallest in diameter, the one in Fig. 5 the largest in diameter, and in Fig. 3 as between the two. This mode of adjusting a drill to the center of a chuck is simple, can be quickly and conveniently accomplished, in fact only requiring one movement, and that the movement of the part C across the part B, and when the parts are secured by the turning of the screw G the chuck will be firm and strong and comparatively a solid one.

To facilitate the adjustment of the part C, when centering the drill, the chuck is provided with a scale, M, on its outer end of part C, representing the different diameters of the drills to which the chuck is suited, and an index-pointer, N, attached to the part B, and projecting over the end of the part C at the scale M, so that knowing the diameter of the drill the part C can be moved until the index-pointer N is over the proper mark on the scale, and then securing the two parts together.

In Fig. 8 is represented a means of moving the part C on the part B by a screw, P. This screw passes through the chuck at the line of joint F, and is arranged to turn loosely in a socket, Q, in the part B, and engage by its screw-threads *d* in the part C.

On the outside of part B are two ear-pieces,

R, one on each side diametrically opposite to each other, the screw P passing through each, and by a circumferential groove, S, in its outer end turning in a socket, T, in one of ear-pieces R the screw is prevented from moving longitudinally when turned, and consequently the part C will be moved across the part B according as the screw P is turned to the right or left, by which the parts are readily and properly adjusted.

The joint F can be of other forms than as shown—as, for instance, by a tongue-and-groove joint, or in any suitable manner—but as shown is practical, and has many advantages—for instance, by reason of the angular direction of the screw G in relation to the joint F the tighter the screw is turned the closer the two parts will be brought together, for the reason that they act somewhat on a wedge principle.

The scale M can be on the side of the chuck, the index-pointer being arranged accordingly.

Having thus described my invention, what I claim is—

1. A chuck for drills, &c., formed of two parts, B and C, arranged to slide the one across the other, and having a screw, G, substantially as and for the purpose specified.

2. A chuck for drills, &c., formed of two parts, B and C, arranged to slide the one across the other, having a screw, G, and a screw, P, substantially as and for the purpose specified.

3. A chuck for drills, &c., formed of two parts, B and C, arranged to slide the one across the other, having a screw, G, a scale, M, and index-pointer N, substantially as and for the purpose specified.

4. A chuck for drills, &c., formed of two parts, B and C, and arranged to fit and to be secured together by a joint, F, and screw G, for the purpose specified.

5. A chuck for drills, &c., formed of two parts, B and C, arranged to slide the one across the other, and having a screw, G, one of said parts having a V-shaped bearing, J, and set-screw L, substantially as and for the purpose specified.

In testimony whereof I have hereunto set my hand in the presence of two subscribing witnesses.

CARLOS W. GLOVER.

Witnesses:
EDWIN W. BROWN,
WM. S. BELLOWS.